US011693478B2

(12) United States Patent
Buck

(10) Patent No.: US 11,693,478 B2
(45) Date of Patent: *Jul. 4, 2023

(54) ATTENTION-BASED TRADING DISPLAY FOR PROVIDING USER-CENTRIC INFORMATION UPDATES

(71) Applicant: TRADING TECHNOLOGIES INTERNATIONAL INC., Chicago, IL (US)

(72) Inventor: Brian J. Buck, Livermore, CA (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/570,932

(22) Filed: Jan. 7, 2022

(65) Prior Publication Data

US 2022/0129070 A1 Apr. 28, 2022

Related U.S. Application Data

(63) Continuation of application No. 16/879,131, filed on May 20, 2020, now Pat. No. 11,256,329, which is a
(Continued)

(51) Int. Cl.
*G06Q 40/04* (2012.01)
*G06F 3/01* (2006.01)
(Continued)

(52) U.S. Cl.
CPC ............ *G06F 3/013* (2013.01); *G06F 3/1431* (2013.01); *G06Q 30/0201* (2013.01);
(Continued)

(58) Field of Classification Search
USPC .......................................... 705/37
See application file for complete search history.

(56) References Cited

U.S. PATENT DOCUMENTS 4,644,472 A 2/1987 Montgomery
5,220,361 A 6/1993 Lehmer et al.
(Continued)

OTHER PUBLICATIONS

"UK—Cautious Investment in Digital Investment in the City," Dealing Technology Bulletin, Jan. 1, 1991, p. 4.
(Continued)

*Primary Examiner* — Ambreen A. Alladin
(74) *Attorney, Agent, or Firm* — McDonnell Boehnen Hulbert & Berghoff LLP

(57) ABSTRACT

A system, method, and non-transitory computer-readable information recording medium displays information to a user. Market data having a first portion and a second portion is displayed on a display unit of a trading device. A user focus area is detected, at the trading device. The user focus area is associated with one of the first and second portions of the market data. A first priority is assigned to the one of the first and second portions of the market data and a second priority is assigned to another one of the first and second portions of the market data. The first priority is higher than the second priority. The market data in the first and second portions is updated as a function of the first and second priorities, respectively.

10 Claims, 11 Drawing Sheets

Related U.S. Application Data continuation of application No. 16/123,782, filed on Sep. 6, 2018, now Pat. No. 10,698,480, which is a continuation of application No. 15/683,514, filed on Aug. 22, 2017, now Pat. No. 10,101,808, which is a continuation of application No. 13/934,785, filed on Jul. 3, 2013, now Pat. No. 9,772,685.

(51) Int. Cl.
　　*G06F 3/14*　　　(2006.01)
　　*G06Q 30/0201*　(2023.01)
　　*G09G 5/14*　　　(2006.01)

(52) U.S. Cl.
　　CPC ............. *G06Q 40/04* (2013.01); *G09G 5/14* (2013.01); *G09G 2360/04* (2013.01)

(56) References Cited

U.S. PATENT DOCUMENTS

| | | | |
|---|---|---|---|
| 5,339,392 | A | 8/1994 | Risberg et al. |
| 5,347,452 | A | 9/1994 | Bay, Jr. |
| 5,471,542 | A | 11/1995 | Ragland |
| 5,596,699 | A | 1/1997 | Driskell |
| 5,689,651 | A | 11/1997 | Lozman |
| 5,797,002 | A | 8/1998 | Patterson, Jr. et al. |
| 5,831,954 | A | 11/1998 | Sako et al. |
| 5,937,388 | A | 8/1999 | Davis et al. |
| 6,106,119 | A | 8/2000 | Edwards |
| 6,134,535 | A | 10/2000 | Belzberg |
| 6,272,474 | B1 | 8/2001 | Garcia |
| 6,577,329 | B1 | 6/2003 | Flickner et al. |
| 6,608,615 | B1 | 8/2003 | Martins |
| 6,766,304 | B2 | 7/2004 | Kemp, II et al. |
| 6,772,132 | B1 | 8/2004 | Kemp, II et al. |
| 6,792,617 | B2 | 9/2004 | Gorbatov et al. |
| 6,801,201 | B2 | 10/2004 | Escher |
| 6,883,143 | B2 | 4/2005 | Driskell |
| 6,910,024 | B2 | 6/2005 | Krishnamurthy et al. |
| 6,934,735 | B1 | 8/2005 | Emens et al. |
| 6,981,052 | B1 | 12/2005 | Cheriton |
| 6,988,132 | B2 | 1/2006 | Horvitz |
| 7,000,181 | B2 | 2/2006 | Press |
| 7,002,570 | B2 | 2/2006 | Perry et al. |
| 7,110,974 | B1 | 9/2006 | Rust |
| 7,113,190 | B2 | 9/2006 | Heaton |
| 7,124,110 | B1 | 10/2006 | Kemp, II et al. |
| 7,127,424 | B2 | 10/2006 | Kemp, II et al. |
| 7,138,575 | B2 | 11/2006 | Childs, Jr. et al. |
| 7,139,938 | B2 | 11/2006 | Marwaha |
| 7,143,186 | B2 | 11/2006 | Stewart et al. |
| 7,155,477 | B2 | 12/2006 | Blair et al. |
| 7,177,833 | B1 | 2/2007 | Marynowski et al. |
| 7,184,966 | B1 | 2/2007 | Parsonnet et al. |
| 7,202,793 | B2 | 4/2007 | Grace et al. |
| 7,239,612 | B1 | 7/2007 | Cole et al. |
| 7,260,543 | B1 | 8/2007 | Saulpaugh et al. |
| 7,308,428 | B1 | 12/2007 | Federspiel et al. |
| 7,356,501 | B2 | 4/2008 | Churquina |
| 7,389,268 | B1 | 6/2008 | Kemp, II et al. |
| 7,391,887 | B2 | 6/2008 | Durnell |
| 7,394,968 | B2 | 7/2008 | Watkins |
| 7,401,334 | B2 | 7/2008 | Fussell |
| 7,434,225 | B2 | 10/2008 | Groetzner et al. |
| 7,447,645 | B2 | 11/2008 | Spragle et al. |
| 7,469,283 | B2 | 12/2008 | Eyal et al. |
| 7,493,407 | B2 | 2/2009 | Leedom et al. |
| 7,552,077 | B1 | 6/2009 | Schluetter et al. |
| 7,562,041 | B2 | 7/2009 | Chehade et al. |
| 7,590,587 | B2 | 9/2009 | Duquette |
| 7,680,721 | B2 | 3/2010 | Cutler |
| 7,685,049 | B1 | 3/2010 | Singer |
| 7,698,187 | B2 | 4/2010 | Huizing et al. |
| 7,701,456 | B1 | 4/2010 | Buck |
| 7,702,806 | B2 | 4/2010 | Gil et al. |
| 7,739,182 | B2 | 6/2010 | Myr |
| 7,743,340 | B2 | 6/2010 | Horvitz et al. |
| 7,747,486 | B1 | 6/2010 | Smith |
| 7,747,513 | B2 | 6/2010 | Duquette et al. |
| 7,758,811 | B2 | 7/2010 | Durack et al. |
| 7,761,362 | B2 | 7/2010 | Triplett |
| 7,783,558 | B1 | 8/2010 | Schwarz et al. |
| 7,818,232 | B1 | 10/2010 | Mead et al. |
| 7,844,726 | B2 | 11/2010 | Foygel et al. |
| 7,844,776 | B2 | 11/2010 | Chen |
| 7,873,827 | B2 | 1/2011 | Miyazawa |
| 7,877,312 | B2 | 1/2011 | Thompson et al. |
| 7,913,183 | B2 | 3/2011 | Czerwinski et al. |
| 7,941,357 | B2 | 5/2011 | Mcgeorge |
| 7,945,508 | B2 | 5/2011 | Duquette et al. |
| 7,962,398 | B1 | 6/2011 | Swearingen et al. |
| 8,108,299 | B1 | 1/2012 | Waelbroeck et al. |
| 8,117,102 | B1 | 2/2012 | Buck |
| 8,131,868 | B2 | 3/2012 | Foygel et al. |
| 8,232,962 | B2 | 7/2012 | Buck |
| 8,286,867 | B1 | 10/2012 | Brown et al. |
| 8,290,850 | B1 | 10/2012 | Singer |
| 8,433,645 | B1 | 4/2013 | Waelbroeck et al. |
| 8,547,330 | B2 | 10/2013 | Buck |
| 8,555,288 | B2 | 10/2013 | Brown et al. |
| 8,560,429 | B2 | 10/2013 | Buck |
| 8,745,157 | B2 | 6/2014 | Bradnick et al. |
| 8,854,302 | B2 | 10/2014 | Buck |
| 8,868,776 | B2 | 10/2014 | Foygel et al. |
| 9,351,133 | B2 | 5/2016 | Offen et al. |
| 9,450,404 | B2 | 9/2016 | Chung |
| 9,639,896 | B2 | 5/2017 | Foygel et al. |
| 9,772,685 | B2 | 9/2017 | Buck |
| 10,101,808 | B2 | 10/2018 | Buck |
| 10,380,688 | B2 | 8/2019 | Foygel et al. |
| 10,460,387 | B2 | 10/2019 | Singer et al. |
| 10,467,691 | B2 | 11/2019 | Singer et al. |
| 10,698,480 | B2 | 6/2020 | Buck |
| 11,138,663 | B2 | 10/2021 | Singer et al. |
| 11,176,611 | B2 | 11/2021 | Singer et al. |
| 11,256,329 | B2 | 2/2022 | Buck |
| 2001/0056391 | A1 | 12/2001 | Schultz |
| 2002/0023038 | A1 | 2/2002 | Fritsch et al. |
| 2002/0026404 | A1 | 2/2002 | Thompson |
| 2002/0039111 | A1 | 4/2002 | Gips et al. |
| 2002/0052821 | A1 | 5/2002 | Terashima |
| 2002/0055899 | A1 | 5/2002 | Williams |
| 2002/0069079 | A1 | 6/2002 | Vega |
| 2002/0130858 | A1 | 9/2002 | Perry et al. |
| 2002/0130868 | A1 | 9/2002 | Smith |
| 2002/0161685 | A1 | 10/2002 | Dwinnell |
| 2002/0174199 | A1 | 11/2002 | Horvitz |
| 2002/0188654 | A1 | 12/2002 | Tedone et al. |
| 2003/0009411 | A1 | 1/2003 | Ram et al. |
| 2003/0038754 | A1 | 2/2003 | Goldstein et al. |
| 2003/0177085 | A1 | 9/2003 | Buckwalter et al. |
| 2003/0236737 | A1 | 12/2003 | Kemp, II et al. |
| 2004/0055447 | A1 | 3/2004 | Childs, Jr. et al. |
| 2004/0056900 | A1* | 3/2004 | Blume .................. G06F 3/0481 715/807 |
| 2004/0066414 | A1 | 4/2004 | Czerwinski et al. |
| 2004/0070509 | A1 | 4/2004 | Grace et al. |
| 2004/0098462 | A1 | 5/2004 | Horvitz et al. |
| 2004/0100467 | A1 | 5/2004 | Heaton |
| 2004/0210504 | A1 | 10/2004 | Rutman |
| 2005/0060256 | A1 | 3/2005 | Peterson et al. |
| 2005/0122985 | A1 | 6/2005 | Murphy |
| 2005/0144113 | A1 | 6/2005 | Opperman et al. |
| 2005/0192887 | A1 | 9/2005 | Triplett |
| 2006/0037038 | A1 | 2/2006 | Buck |
| 2006/0080215 | A1 | 4/2006 | Warsaw et al. |
| 2006/0195508 | A1 | 8/2006 | Bernardin et al. |
| 2006/0259384 | A1 | 11/2006 | Schluetter et al. |
| 2006/0265651 | A1* | 11/2006 | Buck .................... G06F 3/1431 715/700 |
| 2006/0294228 | A1 | 12/2006 | Almstrom |
| 2007/0100735 | A1 | 5/2007 | Kemp, II et al. |
| 2007/0198397 | A1 | 8/2007 | Mcginley et al. |
| 2008/0049787 | A1 | 2/2008 | McNaughton et al. |

(56) References Cited

U.S. PATENT DOCUMENTS

| | | |
|---|---|---|
| 2008/0097887 A1 | 4/2008 | Duquette et al. |
| 2008/0162324 A1 | 7/2008 | West et al. |
| 2010/0023645 A1 | 1/2010 | Foygel et al. |
| 2010/0228833 A1 | 9/2010 | Duquette et al. |
| 2010/0235273 A1 | 9/2010 | Friesen et al. |
| 2010/0293110 A1 | 11/2010 | Rosenthal et al. |
| 2010/0318673 A1 | 12/2010 | Kemp, II et al. |
| 2011/0040890 A1 | 2/2011 | Foygel et al. |
| 2011/0087581 A1 | 4/2011 | Ram et al. |
| 2011/0106684 A1 | 5/2011 | Fuller et al. |
| 2011/0184849 A1* | 7/2011 | Duquette ............... G06Q 40/04 705/37 |
| 2012/0062729 A1 | 3/2012 | Hart et al. |
| 2012/0109813 A1 | 5/2012 | Buck |
| 2012/0131221 A1 | 5/2012 | Foygel et al. |
| 2012/0203687 A1 | 8/2012 | Schwarz et al. |
| 2012/0233059 A1 | 9/2012 | Buck |
| 2013/0160073 A1 | 6/2013 | You |
| 2013/0185421 A1 | 7/2013 | Yang |
| 2013/0294336 A1 | 11/2013 | Morken et al. |
| 2013/0339214 A1 | 12/2013 | Buck |
| 2014/0019325 A1 | 1/2014 | Buck |
| 2014/0188682 A1 | 7/2014 | Singer et al. |
| 2014/0280621 A1 | 9/2014 | Bourdaillet et al. |
| 2015/0006356 A1 | 1/2015 | Foygel et al. |
| 2015/0012403 A1 | 1/2015 | Buck |
| 2015/0036569 A1 | 2/2015 | Vannithamby et al. |
| 2015/0046514 A1 | 2/2015 | Madan et al. |
| 2015/0170274 A1 | 6/2015 | Singer et al. |
| 2016/0105561 A1 | 4/2016 | Glagolev et al. |
| 2017/0180336 A1 | 6/2017 | Josephson et al. |
| 2017/0186088 A1 | 6/2017 | Foygel et al. |
| 2017/0371409 A1 | 12/2017 | Buck |
| 2018/0357573 A1 | 12/2018 | Scarborough et al. |
| 2019/0011985 A1 | 1/2019 | Buck |
| 2019/0311435 A1 | 10/2019 | Foygel et al. |
| 2020/0020035 A1 | 1/2020 | Singer et al. |
| 2020/0034930 A1 | 1/2020 | Singer et al. |
| 2021/0407004 A1 | 12/2021 | Singer et al. |
| 2022/0020090 A1 | 1/2022 | Singer et al. |

OTHER PUBLICATIONS

Definition of the term "period of time" Webpage [online], The Free Dictionary, Princeton University and Farlex, Inc., n.d., 2 pages. [Retrieved on May 10, 2012] from the Internet: http://www.thefreedictionary.com/period+of+time.

Definition of the term "substantial" Webpage [online], Free Merriam-Webster Dictionary, Merriam-Webster, Inc., 2012 2 pages. [Retrieved on May 10, 2012] from the Internet: http://www.merriam-webster.com/dictionary/substantial.

Extended European Search Report in European Patent Application No. 09803429.1 dated Aug. 12, 2013, dated Aug. 26, 2013.

Gresh, D.L., et al., "An Interactive Framework for Visualizing Foreign Currency Exchange Options," Proceeding Visualization 1999, San Francisco, CA, Oct. 24, 29, 1999, Piscataway, NY: IEEE, 1999, Abstract, p. 1.

International Search Report of International Application No. PCT/US2005/021700, dated Oct. 25, 2005 (dated Dec. 29, 2005).

International Search Report and Written Opinion of International Application No. PCT/US2013/035652, dated Jul. 2, 2013 (dated Jul. 11, 2013).

International Search Report of International Application No. PCT/US2009/051820, dated Sep. 1, 2009 (dated Sep. 15, 2009).

Jereski, L. and Zweig, C., "The Mouse that Trades," Forbes, Oct. 28, 1991, p. 186 [Retrieved on Nov. 2, 2009] from Dialog at https://www.dialogclassic.com/mainframe/html (3 pages).

Macklem, K., "Only for the Stout of Heart: In the Heat of a Day-Trading Room, a Mere Touch on a Computer Keyboard as You Watch Intraday Gyrations of Stock Markets Can Earn or Cost Thousands of Dollars," Feb. 13, 1999, pp. 1-2.

Takaaki, Y., "Stock Violation Index Calculation Processing Program," Feb. 21, 2003, p. 1.

\* cited by examiner

ATTENTION-BASED TRADING DISPLAY FOR PROVIDING USER-CENTRIC INFORMATION UPDATES

CROSS-REFERENCE TO RELATED APPLICATIONS

This patent application is a continuation of U.S. application Ser. No. 16/879,131, filed May 20, 2020, now U.S. Pat. No. 11,256,329, which is a continuation of U.S. application Ser. No. 16/123,782, filed Sep. 6, 2018, now U.S. Pat. No. 10,698,480, which is a continuation of U.S. application Ser. No. 15/683,514, filed Aug. 22, 2017, now U.S. Pat. No. 10,101,808, which is a continuation of U.S. application Ser. No. 13/934,785, filed July 3, 2013, now U.S. Pat. No. 9,772,685, the contents of each of which are hereby incorporated by reference for all purposes. This application also relates to U.S. application Ser. No. 16/022,036, filed Jun. 28, 2018, which is a continuation of U.S. application Ser. No. 14/473,867, filed Aug. 29, 2014, now U.S. Pat. No. 10,037,079, which is a continuation of U.S. application Ser. No. 13/969,496, filed Aug. 16, 2013, now U.S. Pat. No. 8,854,302, which is a continuation of U.S. application Ser. No. 13/478,889, filed May 23, 2012, now U.S. Pat. No. 8,547,330, which is a continuation of U.S. application Ser. No. 10/872,617, filed Jun. 21, 2004, now U.S. Pat. No. 8,232,962.

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

The exchange is a central marketplace with established rules and regulations where buyers and sellers meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. Electronic exchanges have made it possible for an increasing number of people to actively participate in a market at any given time. The increase in the number of potential market participants has advantageously led to, among other things, a more competitive market and greater liquidity.

With respect to electronic exchanges, buyers and sellers may logon to an electronic exchange trading platform by way of a communication link through their user terminals or trading device. Once connected, buyers and sellers may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic", such as a combination of real products that is created by the user. A tradeable object could actually be a combination of other tradeable objects, such as a class of tradeable objects.

To profit in electronic markets, successful market participants often assimilate large amounts of data in order to recognize market trends and to view current market conditions. Screen space is an important factor for a trader to consider when setting up a trading workstation, since the screen space directly affects the trader's ability to quickly view and process market data. Many traders use one large monitor running at a very high resolution in an effort to get the maximum amount of data onto the screen. However, in today's information-intensive markets, to be successful, traders often need to simultaneously view multiple trading interfaces, charts, industry news, spreadsheets, as well as other information. Since each application-created interface has at least one window, a single monitor does not allow a trader to simultaneously view data on multiple windows, and the time it takes the trader to flip between the windows does not make the single monitor the most optimal trading workspace solution.

Therefore, many traders use multiple monitors to avoid flipping from one window to another, and to efficiently view all windows simultaneously. However, traders with multiple monitors can actually only look closely at one monitor at a time. Although the human peripheral field of vision is approximately 180°, the field of foveal vision (the region of the visual field where the user has the greatest visual activity) is approximately 2°. Therefore, a trader can only attend to a small part of each display at any one point in time.

The use of a large monitor or multiple monitors allows a tremendous amount of data to be displayed at any one time. Typically, such data is continuously being delivered from the exchange to the trading device. The data may be displayed directly, as soon as it is being delivered/received or the data may be filtered, e.g., coalesced or filtered, prior to being displayed at the trading device. Therefore, all of the data being transmitted and received at the trading device, must be processed and displayed, even if the trader is not looking at the portion of the display(s) which is displaying most of the data. Furthermore, of the data that is coalesced or filtered prior to displaying on the trading device, all of the data is coalesced, or otherwise filtered, and displayed, even if the trader is not looking at the portion of the display(s) which is displaying the filtered data.

The present invention is aimed at one or more of the problems identified above.

BRIEF DESCRIPTION OF THE FIGURES

Certain embodiments are disclosed with reference to the following drawings.

Figure 1:
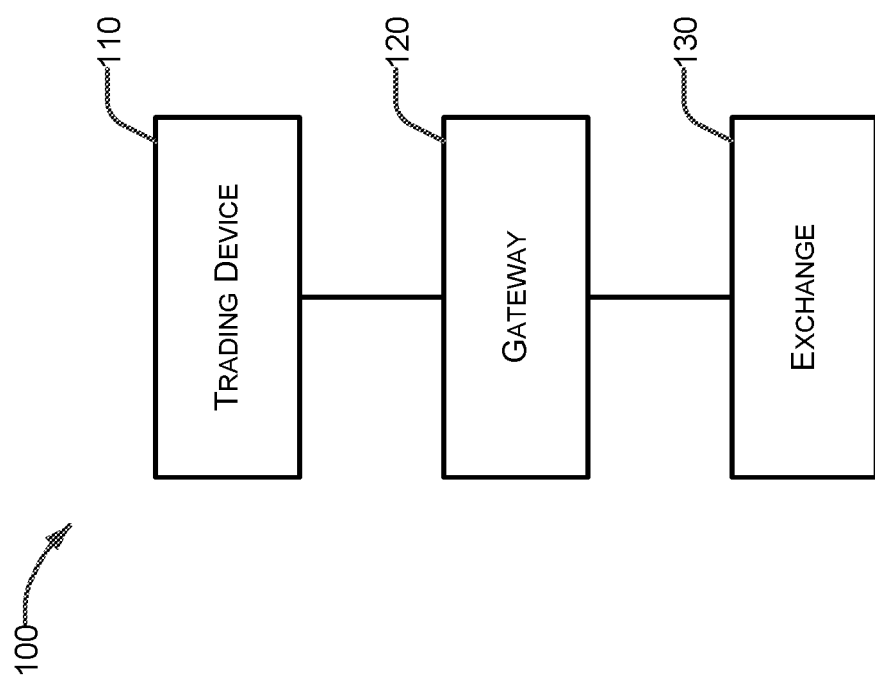
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

The present invention relates generally to a computer system which is used to electronically perform trades on an exchange, and more particularly, to a system which electronically tracks a focus of the user of the computer system and prioritizes the updating of the information displayed on one or more display units of the computer system based on the tracked focus.

In one aspect of the present invention, the user's focus is detected and used to define a user focus area on the display unit. The market data is separated into first and second portion. The portion of the data which is being displayed in the user focus area is defined as the first portion of the market data. The market data displayed in the other portion of the display unit is defined as a second portion of the market data. The first portion of the data, which is displayed in the user focus area, is updated based on a first priority and according to an associated first schedule. The second portion of the data, which is displayed in a second area of the display, is updated based on a second priority and according to an associated second schedule.

For instance, the first and second schedules may determine (1) how often the display of the corresponding data is updated on the display unit and (2) the period over which the data is coalesced (or condensed). For example, price information for a particular article or object may include a parameter associated with the object's current price, as well as a differential from a previous update or period of time. The first and second schedules may determine not only how often the display is updated, but may include how often the differential is calculated at either, for example, the exchange or one or more of the individual trading devices.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

In a first aspect of the present invention, a method of displaying information to a user is provided. The method includes the steps of displaying market data on a display unit of a trading device and detecting, at the trading device, a user focus area of the display unit. The market data has a first portion and second portion. The user focus area is associated with one of the first and second portions of the market data and another one of the first and second portions of the market data being associated with a second area of the display unit. The method includes the step of assigning a first priority to the one of the first and second portions of the market data and a second priority to another one of the first and second portions of the market data. The first priority is higher than the second priority. The method further includes the steps of updating the market data in the one of the first and second portions, and which is being displayed the user focus area, as a function of the first priority and an associated first schedule and updating the market data in the another one of the first and second portions, and which is being displayed in the second area, as a function of the second priority and an associated second schedule.

In a second aspect of the present invention, a system including an exchange and a trading device is provided. The exchange for provides market data to the trading device. The trading device is coupled to the exchange and is configured to receive and display the market data on a display unit. The market data has a first portion and second portion. The trading device is configured to:

detect, a user focus area of the display unit, wherein the user focus area is associated with one of the first and second portions of the market data and another one of the first and second portions of the market data being associated with a second area of the display unit;

assign a first priority to the one of the first and second portions of the market data and a second priority to another one of the first and second portions of the market data, wherein the first priority is higher than the second priority; and, update the market data in the one of the first and second portions and displayed the user focus area as a function of the first priority and an associated first schedule and update the market data in the another one of the first and second portions and being displayed the second area, as a function of the second priority and an associated second schedule.

In a third aspect of the present invention, a non-transitory computer-readable information recording medium which stores a program for controlling a computer to perform trade orders and trade order verification at an exchange is provided. The program is configured to operate the computer as a:

a trading device configured to receive and display the market data on a display unit, the market data having a first portion and second portion, the trading device being configured to:

detect, a user focus area of the display unit, wherein the user focus area is associated with one of the first and second portions of the market data and another one of the first and second portions of the market data being associated with a second area of the display unit;

assign a first priority to the one of the first and second portions of the market data and a second priority to another one of the first and second portions of the market data, wherein the first priority is higher than the second priority; and, update the market data in the one of the first and second portions and displayed the user focus area as a function of the first priority and an associated first schedule and update the market data in the another one of the first and second portions and being displayed the second area, as a function of the second priority and an associated second schedule.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available, there may be "gaps" in market depth.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL™, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In general, the term "coalesce market data" refers to a filtering process in which the received data is modified in some manner prior to the data being displayed on the trading device 110. The received market data may be filtered or modified, e.g., to fit the needs of the contract, trade order, trading application, or focus area in which the data is being displayed. For example, it may be desired to display a change in the market data over a specific time period. Or, it may be desirable to update the data on a predetermined time cycle.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
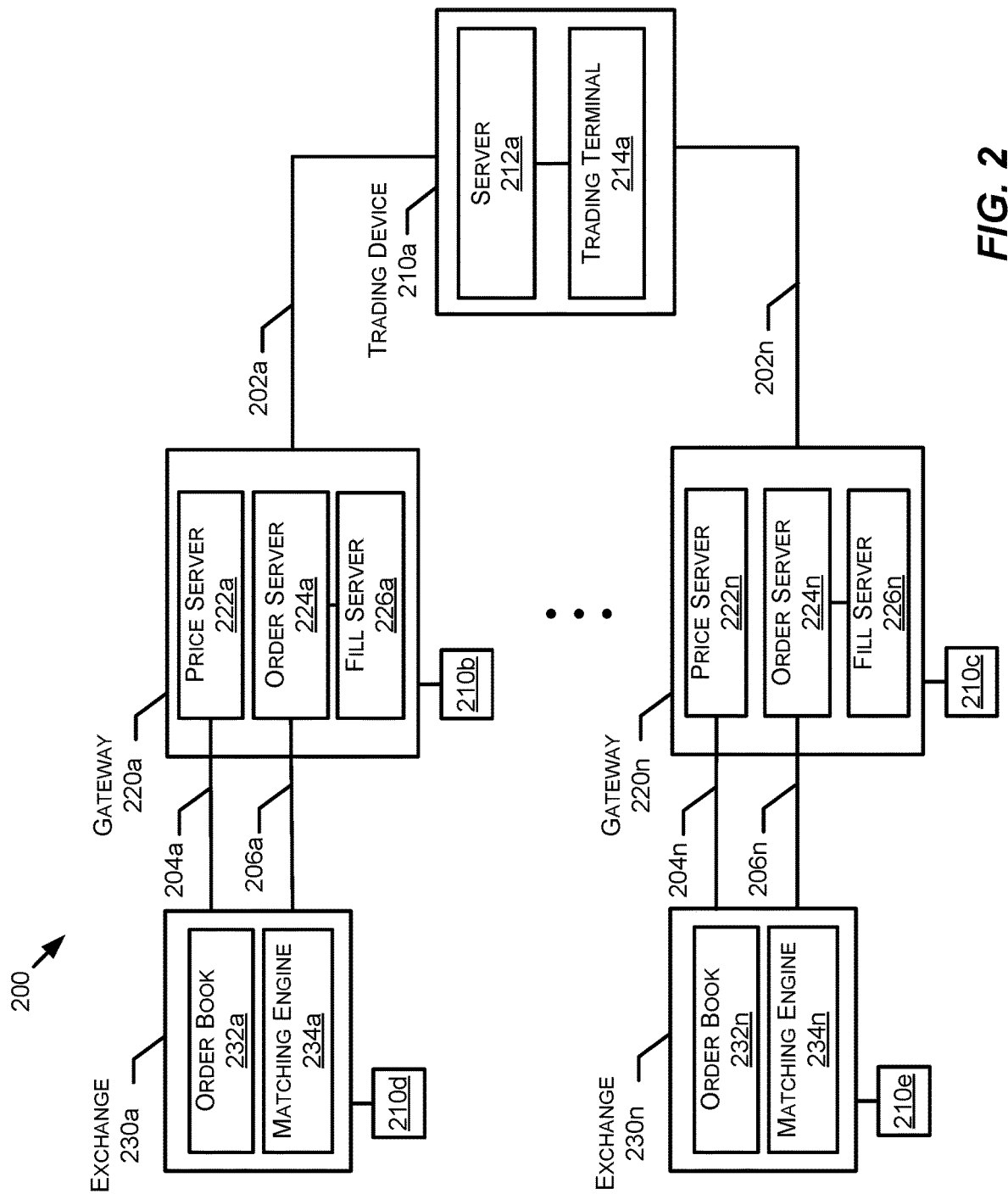
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210a is in communication with an exchange 230a through a gateway 220a. The following discussion mainly focuses on the trading device 210a, gateway 220a, and the exchange 230a. However, the trading device 210a may also be connected to and communicate with any number of gateways 220n connected to exchanges 230n. The communication between the trading device 210a and other exchanges 230n may be the same, similar, or different than the communication between the trading device 210a and exchange 230a. Generally, each exchange has its own preferred techniques and/or formats for communicating with a trading device, a gateway, the user, or another exchange.

The trading device 210a, which may be similar to the trading device 110 in FIG. 1, may include a server 212a in communication with a trading terminal 214a. The server 212a may be located geographically closer to the gateway 220a than the trading terminal 214a. As a result, the server 212a latency benefits that are not afforded to the trading terminal 214a. In operation, the trading terminal 214a may provide a trading screen to a user and communicate commands to the server 212a for further processing. For example, a trading algorithm may be deployed to the server 212a for execution based on market data. The server 212a may execute the trading algorithm without further input from the user. In another example, the server 212a may include a trading application providing automated trading tools and communicate back to the trading terminal 214a. The trading device 210a may include, additional, different, or fewer components.

The trading device 210a may communicate with the gateway 220a using one or more communication networks. As used herein, a communication network is any network, including the Internet, which facilitates or enables communication between, for example, the trading device 210a, the gateway 220a and the exchange 230a. For example, as shown in FIG. 2, the trading device 210a may communicate with the gateway 220a across a multicast communication network 202a. The data on the network 202a may be logically separated by subject (for example, prices, orders, or fills). As a result, the server 212a and trading terminal 214a can subscribe to and receive data (for example, data relating to prices, orders, or fills) depending on their individual needs.

The gateway 220a, which may be similar to the gateway 120 of FIG. 1, may include a price server 222a, order server 224a, and fill server 226a. The gateway 220a may include additional, different, or fewer components. The price server 222a may process price data. Price data includes data related to a market for one or more tradeable objects. The order server 224a may process order data. Order data is data related to a user's trade orders. For example, order data may include order messages, confirmation messages, or other types of messages. The fill server 226a collects and provides fill data. Fill data includes data relating to one or more fills of trade orders. For example, the fill server 226a may provide a record of trade orders, which have been routed through the order server 224a, that have and have not been filled. The servers 222a, 224a, 226a may run on the same machine or separate machines.

The gateway 220a may communicate with the exchange 230a using one or more communication networks. For example, as shown in FIG. 2, there may be two communication networks connecting the gateway 220a and the exchange 230a. The network 204a may be used to communicate market data to the price server 222a. In some instances, the exchange 230a may include this data in a data feed that is published to subscribing devices. The network 206a may be used to communicate order data.

The exchange 230a, which may be similar to the exchange 130 of FIG. 1, may include an order book 232a and a matching engine 234a. The exchange 230a may include additional, different, or fewer components. The order book 232a is a database that includes data relating to unmatched quantity of trade orders. For example, an order book 232a may include data relating to a market for a tradeable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price.

In operation, the exchange 230a may provide price data from the order book 232a to the price server 222a and order data and/or fill data from the matching engine 234a to the order server 224a. Servers 222a, 224a, 226a may translate and communicate this data back to the trading device 210a. The trading device 210a, for example, using a trading application, may process this data. For example, the data may be displayed to a user. In another example, the data may be utilized in a trading algorithm to determine whether a trade order should be submitted to the exchange 230a. The trading device 210a may prepare and send an order message to the exchange 230a.

In certain embodiments, the gateway 220a is part of the trading device 210a. For example, the components of the gateway 220a may be part of the same computing platform as the trading device 210a. As another example, the functionality of the gateway 220a may be performed by components of the trading device 210a. In certain embodiments, the gateway 220a is not present. Such an arrangement may occur when the trading device 210a does not need to utilize the gateway 220a to communicate with the exchange 230a, for example. For example, if the trading device 210a has been adapted to communicate directly with the exchange 230a.

Additional trading devices 210b-210e, which are similar to trading device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

IV. Example Computing Device

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

Figure 3A:
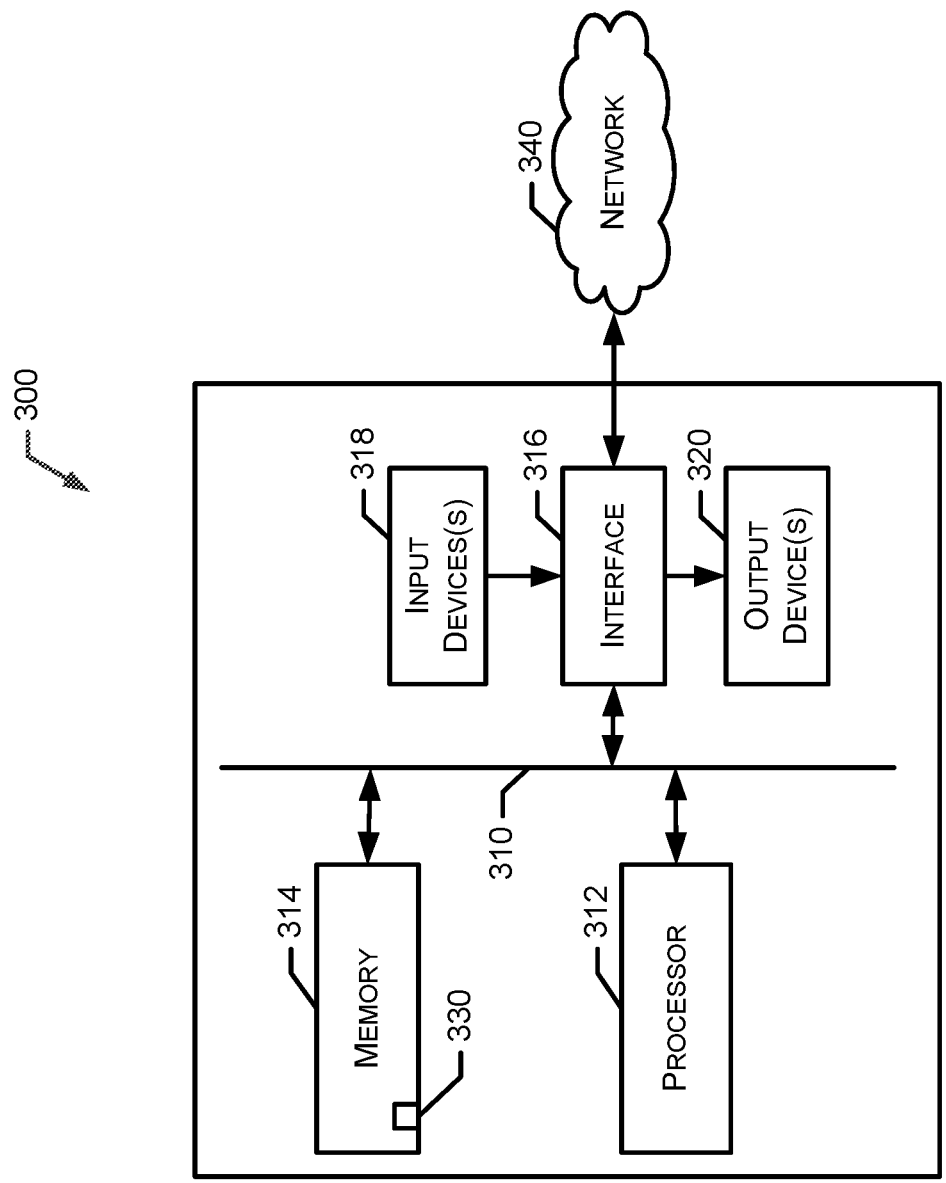
FIG. 3A illustrates a block diagram of an example computing device which may be used to implement the disclosed embodiments.
Figure 3B:
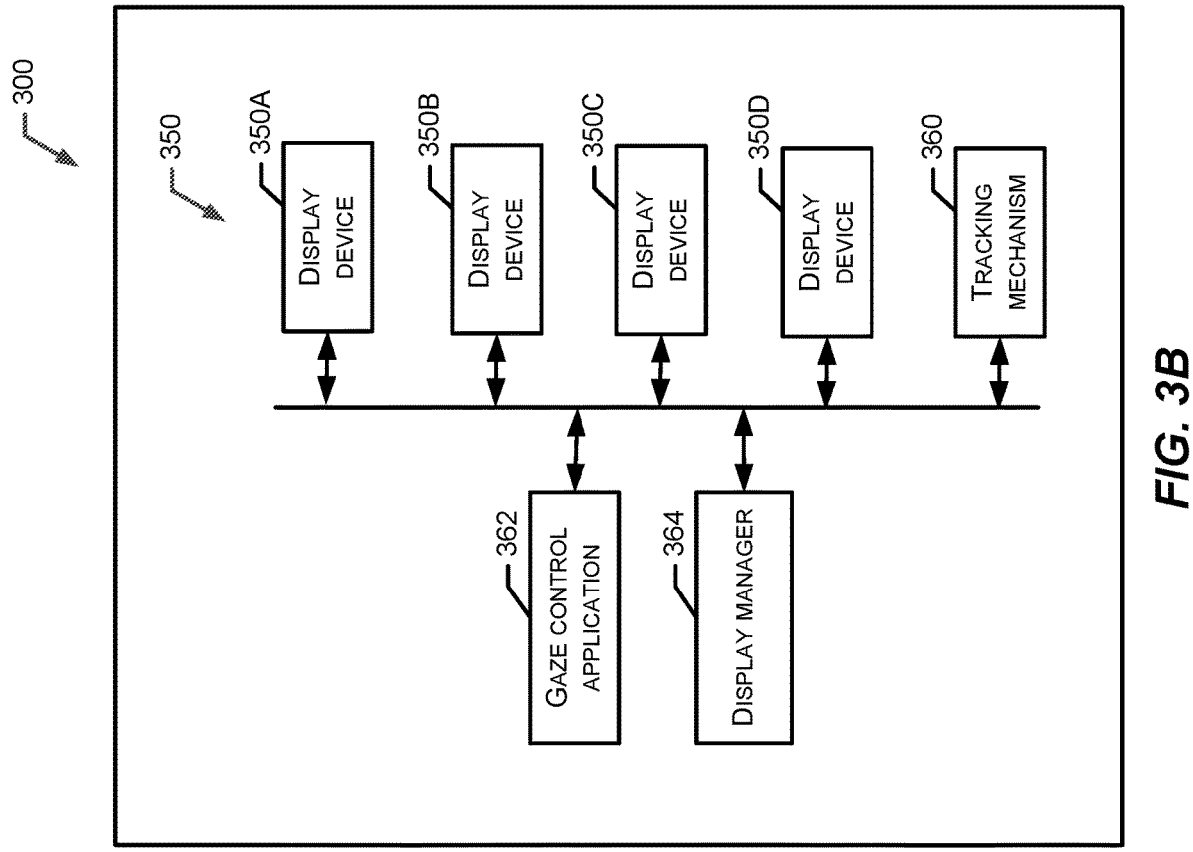
FIG. 3B illustrates a second block diagram of a computing or trading device according to an embodiment of the present invention.

As shown in FIG. 3A, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application 330 may be transferred from the input device 318 and/or the network 340 to the memory 314. When the computing device 300 is running or preparing to run the trading application 330, the processor 312 may retrieve the instructions from the memory 314 via the communication network 310.

V. Attention-Based Trading Display for Providing User-Centric Information Updates With particular reference to FIG. 3B, the output device 320 of the trading device 300 may include a display unit 350 for displaying the market data received from the exchange 130. The market data is deemed to include other information or data than the market data received directly from the exchange 130. For example, the market data may also include data generated by the trading device 300 (as a function of the market data received from the exchange 130 or otherwise), other information (received from other sources), and a user interface, which allows the trader to prepare and communicate trade orders to the exchange 130.

In one embodiment, the display unit 350 is a single display device. In another embodiment, the display unit 350 includes a plurality of device devices. In the illustrated embodiment, the display unit 350 includes first, second, third and fourth display devices 350A, 350B, 350C, 350D, although the present invention is not limited to any number of display devices. In one aspect of the present invention, the display devices 350A, 350B, 350C, 350D are treated as a single large display, where elements (such as windows) displayed thereon are freely moveable across the separate display devices. In other aspect of the present invention, the display devices 350A, 350B, 350C, 350D are treated as a single large display, however, the position of elements or blocks of information are predetermined and generally fixed (although the position may be configurable).

In one aspect of the present invention, the user's focus on a portion of the display unit 350. i.e., the portion of the display unit at which the trader is currently looking, is detected and used to define a user focus area on the display unit. In one embodiment, the user's focus is detected using a tracking mechanism 360. In general, the tracking mechanism 360 may include one or more sensors which are configured to detect the trader's posture, the direction the trader is facing, and/or an area of the display unit at which the trader is currently looking. In the illustrated embodiment, the tracking mechanism 360 may be controlled by and/or the sensor information may be used by a gaze control application 362 which runs on the trading device 110.

In aspect of the present invention, the tracking mechanism 360 includes at least one of a facial recognition system, an acoustic position system, an electromagnetic interference sensing suite, a distance sensor, an imaging sensor and other suitable sensor(s). There are many currently existing technologies providing gaze detection and tracking functionality, and the tracking mechanism 360 can include any existing or later developed gaze detection and tracking systems. According to one embodiment, the tracking mechanism 360 may capture the user's gaze, and then provide the user's gaze position data to a gaze control application 362.

Upon receiving the user's gaze position data, the gaze control application 362 may first determine the user's gaze position coordinates in relation to one of the monitors. When the gaze control application 362 detects a user shifting his eyes away from one of the monitors or a portion of a display on one of the monitors (see below), the gaze control application 362 may provide a signal to a display manager 364 which controls display of information on the display unit 350

The market data is separated into first and second portion. The portion of the data which is being displayed in the user focus area is defined as the first portion of the market data. The market data displayed in the other portion of the display unit is defined as a second portion of the market data. The first portion of the data, which is displayed in the user focus area, is updated based on a first priority and according to an associated first schedule. The second portion of the data, which is displayed in a second area of the display, is updated based on a second priority and according to an associated second schedule.

For instance, the first and second schedules may determine (1) how often the display of the corresponding data is updated with on the display unit (2) the period over which the data is coalesced (or condensed). For example, price information for a particular article or object may include a parameter associated with the object current price, as well as a differential from a previous update or period of time. The first and second schedules may determine not only how often the display is updated, but may include how often the differential is calculated (which may, for example, be done at the exchange 130 or at the individual trading devices 110 shown in FIG. 1.)

Figure 4A:
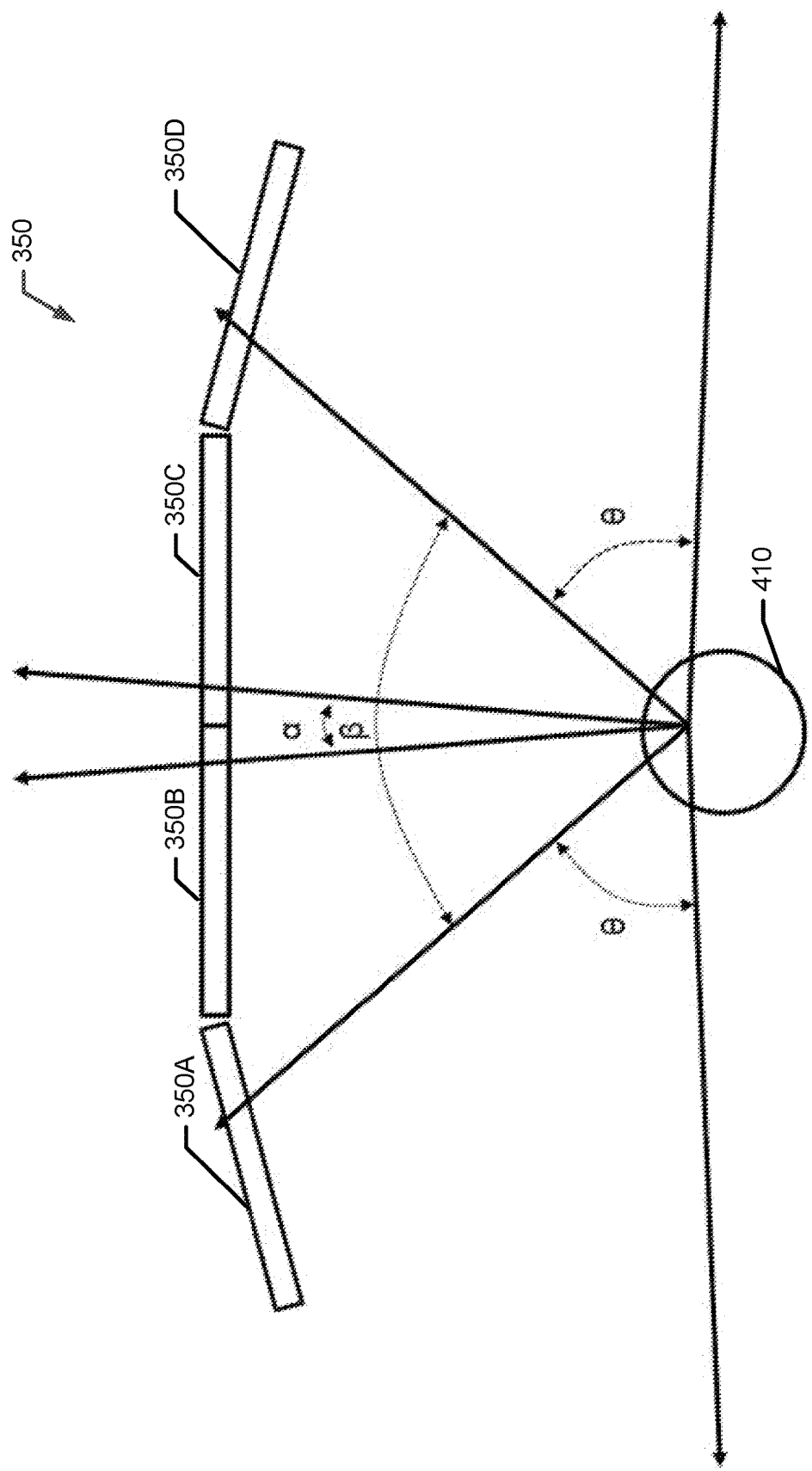
FIG. 4A is a first illustration of a user or trader and a display unit having a plurality of display devices, according to an embodiment of the present invention.
Figure 4B:
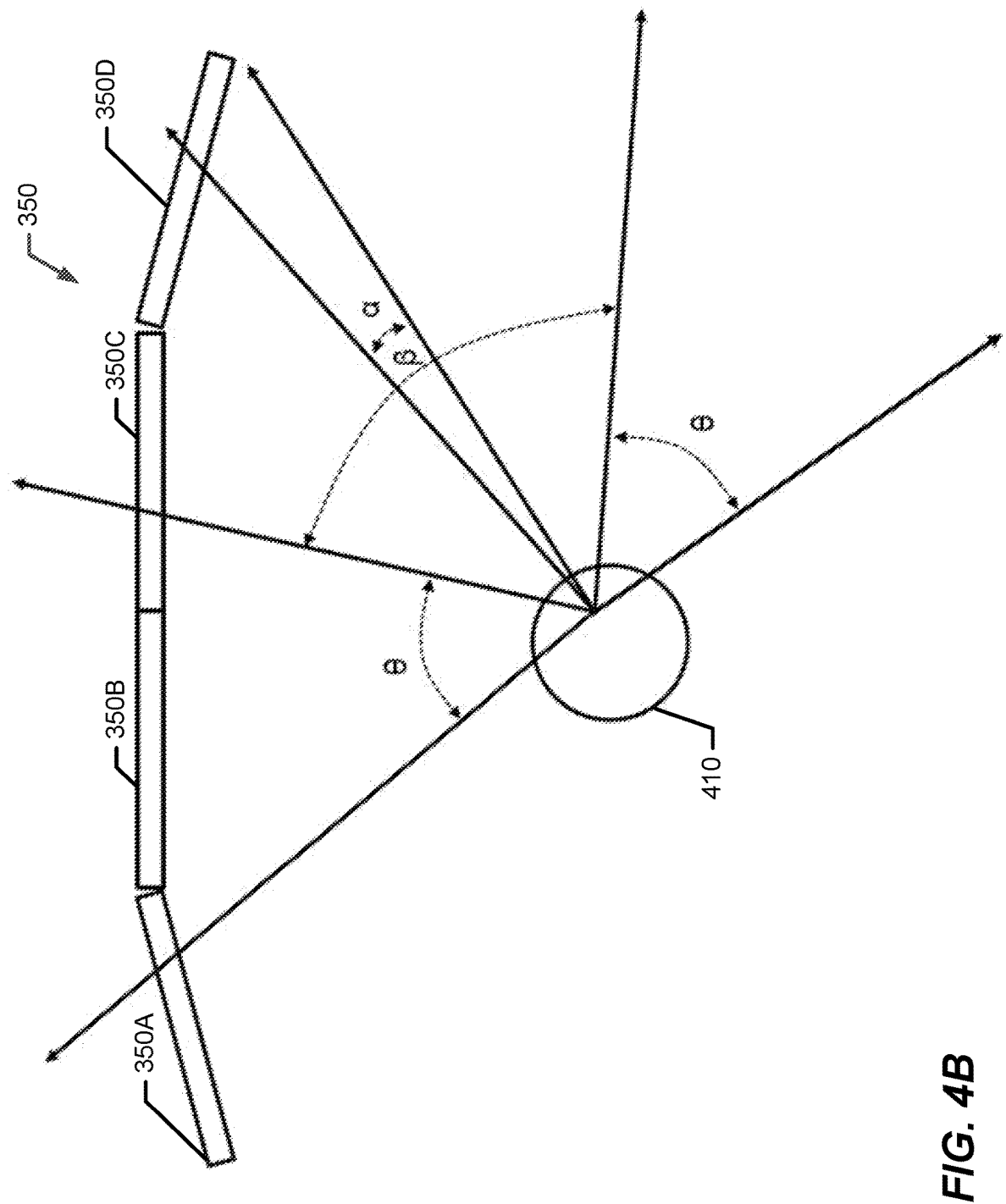
FIG. 4B is an illustration of a user or trader and the display unit of FIG. 4A.

With reference to FIGS. 4A and 4B, an exemplary illustration of a user or trader's 410 field of view with respect to the display devices 350A, 350B, 350C, 350D may be divided into separate sections. In the illustrated view, the full field of view of the trader 410 is represented by $\theta+\beta+\theta$. In general, the trader's field of view will be approximately 180°, but in one embodiment may be between 160° and 200°. The total field of view may be further divided into sub-sections. For example, the trader's 410 field of foveal vision (the region of the visual field where the user has the greatest visual acuity) is generally straight ahead of the trader 410 in the direction in which the trader 410 is looking. In the illustrated embodiment, the trader's field of foveal vision is defined by $\alpha$, and may encompass approximately 2° of the trader's field of view. The trader's 410 binocular vision or field of view is defined by $\beta$ and the trader's 410 peripheral vision is defined by the area outside of the trader's binocular vision, $\theta$.

In general, the trading device 110 prioritizes the update of the data on the display unit 350 based on a priority determined as a function of where the data is located relative to where the trader 410 is looking. For example, if the trader's 410 foveal vision is focused on a particular portion of the display unit 350, that portion of the display unit 350 is defined as a user focus area (see below). The data in the user focus area is given a first or the highest priority, i.e., the data is generally updated more frequently than data outside of the user focus area. For example, any market data received from the exchange 130 may be displayed in real-time, i.e., when received. Additionally, if the market data received from the exchange 130 must be filtered, then this data would be filtered and displayed before similar data is filtered and/or displayed outside of the user focus area.

In another aspect of the present invention, any market data which is located in portions of the display unit 350 which fall within the trader's binocular field of view or vision has a second priority, while any market data which is located in the portions of the display unit 350 which fall outside of the trader's binocular field of view, i.e., with the trader's 410 peripheral view, is given a third priority. In general, the first priority is higher than the second priority and the second priority is higher than the third priority.

As the trader or user 410 turns (the head, torso or body), the trader's 410 field of foveal view turns as well, and may focus on a different portion of the display unit 350. This is illustrated in FIG. 4B, in which the field of foveal view is located on the fourth display device 350D.

It should be noted that while the views in FIGS. 4A and 4B are top views and focus on horizontally (relative to the trader 410) dividing the display unit 350, the present invention may also vertically discriminate the trader's focus area and divide the display unit 350 horizontally and vertically.

In general, the first portion of the market data refers to any data which is being displayed in the current user focus area. The second portion of the market data refers to any data which displayed in a second area, i.e., any portion of the display unit 350 except for the current user focus area.

In one aspect of the present invention, the trading device 110 modifies how the data is displayed, for example, by modifying how the trading application coalesces the market data before it is displayed. For example, in one embodiment of the present invention, the trading application may freeze all updates to the displayed data in the second area, i.e., any portion of the display unit 350 except for the current user focus area. Updates to the second area (or portion thereof) would then begin again when the user's focus returns to the second area (or portion thereof). In another embodiment, if particular market data is displayed as a change in data over a predetermined time period, then the predetermined time period may be modified to be longer if the user is not currently focused on the area of the display unit 350 in which the particular market data is being displayed. Additionally, if particular market data is normally updated on a predetermined time cycle, the updates may be performed on a longer time cycle when the user is not currently focused on the area of the display unit 350 in which the particular market data is being displayed. In general, the trade application will slow down updates, any computations, filtering or coalescing of the received market data (prior to the data being displayed) if the user is not currently focused on the area of the display unit 350 in which the particular data is being displayed.

In another aspect of the present invention the gaze control application 362 may alternatively, or additionally, use a predictive process to predict which area of the display unit 350 the trader 410 is most likely going to view later, or next, based on historical viewing data. The output of the predictive process may also be used to prioritize which areas of the display unit will be, and how they will be, updated.

With reference to FIGS. 5A-5D, the trading device 110 receives and displays the market data on the display unit 350. The trading device 110, via the tracking mechanism 360 and the gaze control application 362, is configured to detect a user focus area 502A of the display unit 350.

Figure 5A:
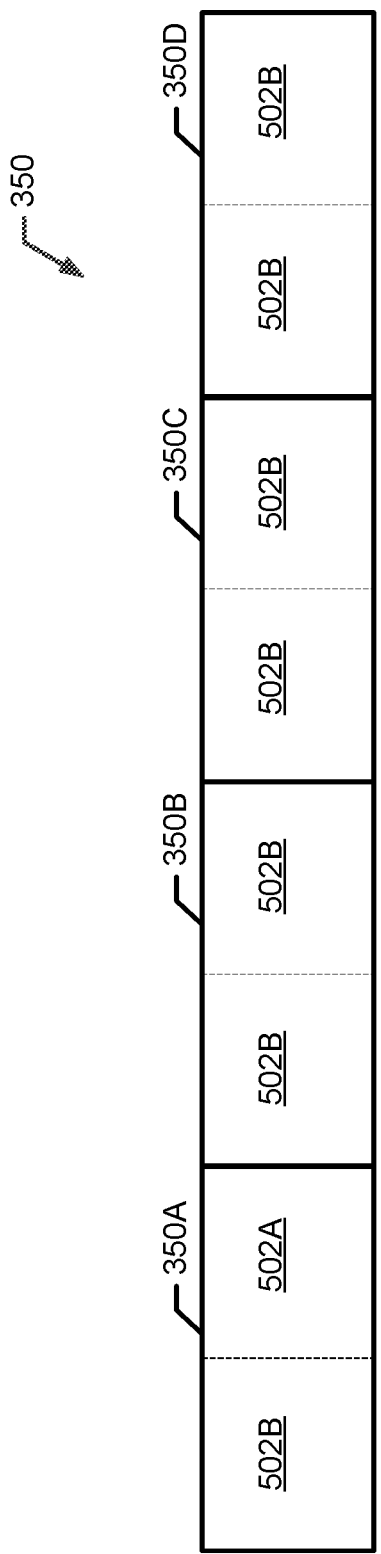
FIG. 5A is a first illustration of a display unit including a plurality of portion areas, according to an embodiment of the present invention.

With particular reference to FIG. 5A, for purposes of simplicity and discussion, the each of the first, second, third, and fourth display devices 350A, 350B, 350C, 350D are divided into two display areas of roughly the same shape. It should be noted, however, that the display devices 350A, 350B, 350C, 350D, may be divided into a different number of areas. The areas of the display devices 350A, 350B, 350C, 350D may be dynamic in terms of number and/or shape for each display device 350A, 350B, 350C, 350D. In the illustrated embodiment, the gaze control application 362 determines at which one of the areas of the display devices 350A, 350B, 350C, 350D the user is currently (or will be looking) and establishes that area as the user focus area 502A. In the example of FIG. 5A, the right area of the first display device 350A has been determined to be the current user focus area 502A. In this example, all other areas are designated as a second area 502B.

The trading device 110 assigns a first priority to the market data currently being displayed in the user focus area 502A and a second priority to the market data currently being displayed in the second focus area 502B. The first priority is higher than the second priority, such that the market data currently being displayed in the user focus area 502A is updated and/or coalesced more frequently than the market data currently being displayed in the second are 502B.

In one embodiment of the present invention, the first and second priorities have an associated schedule, i.e., the first and second schedule. For example, the first and second schedules may include a first period which determines how often the area assigned the respective priority is updated and a second period which determines how often the data assigned to the same area is updated (for instance, if the market data received from the exchange 130 is updated.

The trading device 110 is further configured to update the market data displayed in the user focus area as a function of the first priority and the first schedule and update the market data displayed in the second area, as a function of the second priority and the associated second schedule.

In another embodiment of the present invention, one or more of the second areas 502B may be assigned a different priority. In one embodiment, the priority may be based on a relative distance from the user focus area 502A. For example, the second areas 502B to the immediate right and/or left of the user focus area 502A may be assigned the second priority. Furthermore, the next area 502B (away from the user focus area 502A) to the right or left may be assigned a third priority (with an associated schedule) and so on. In general, the second priority will be higher than the third priority.

Figure 5B:
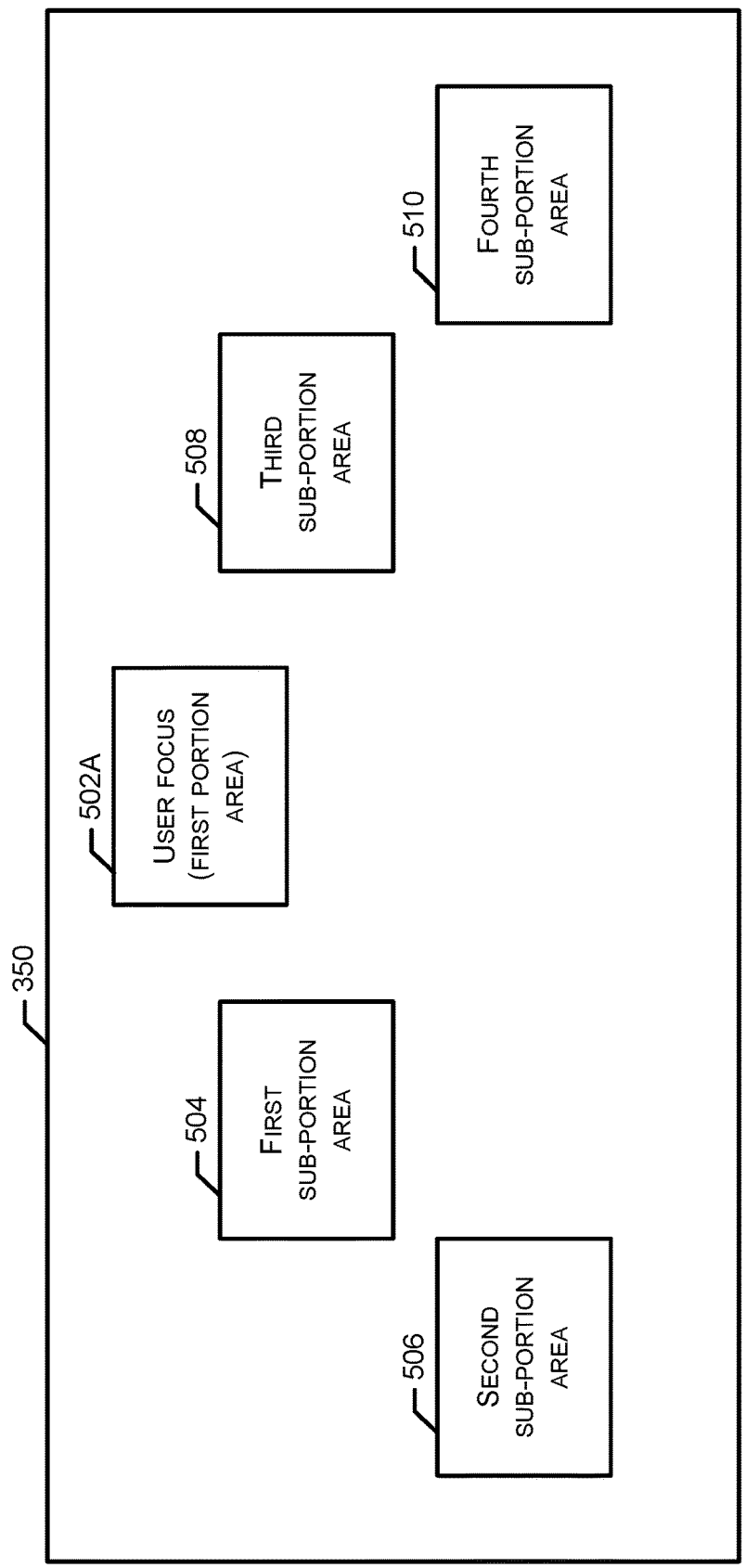
FIG. 5B is a first illustration of a display unit including a plurality of portion areas, according to an embodiment of the present invention.
Figure 5C:
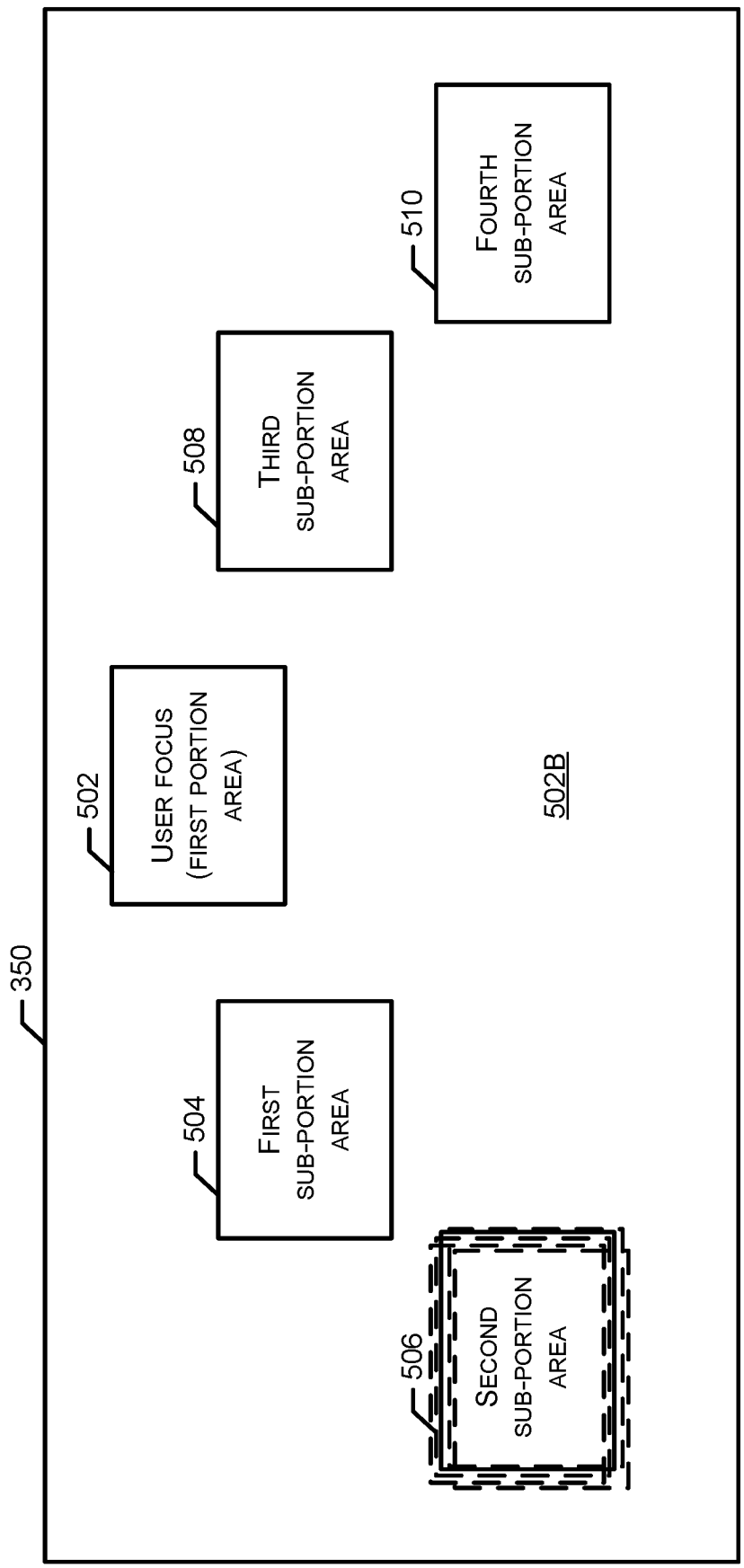
FIG. 5C is a second illustration of the display unit of FIG. 5B.
Figure 5D:
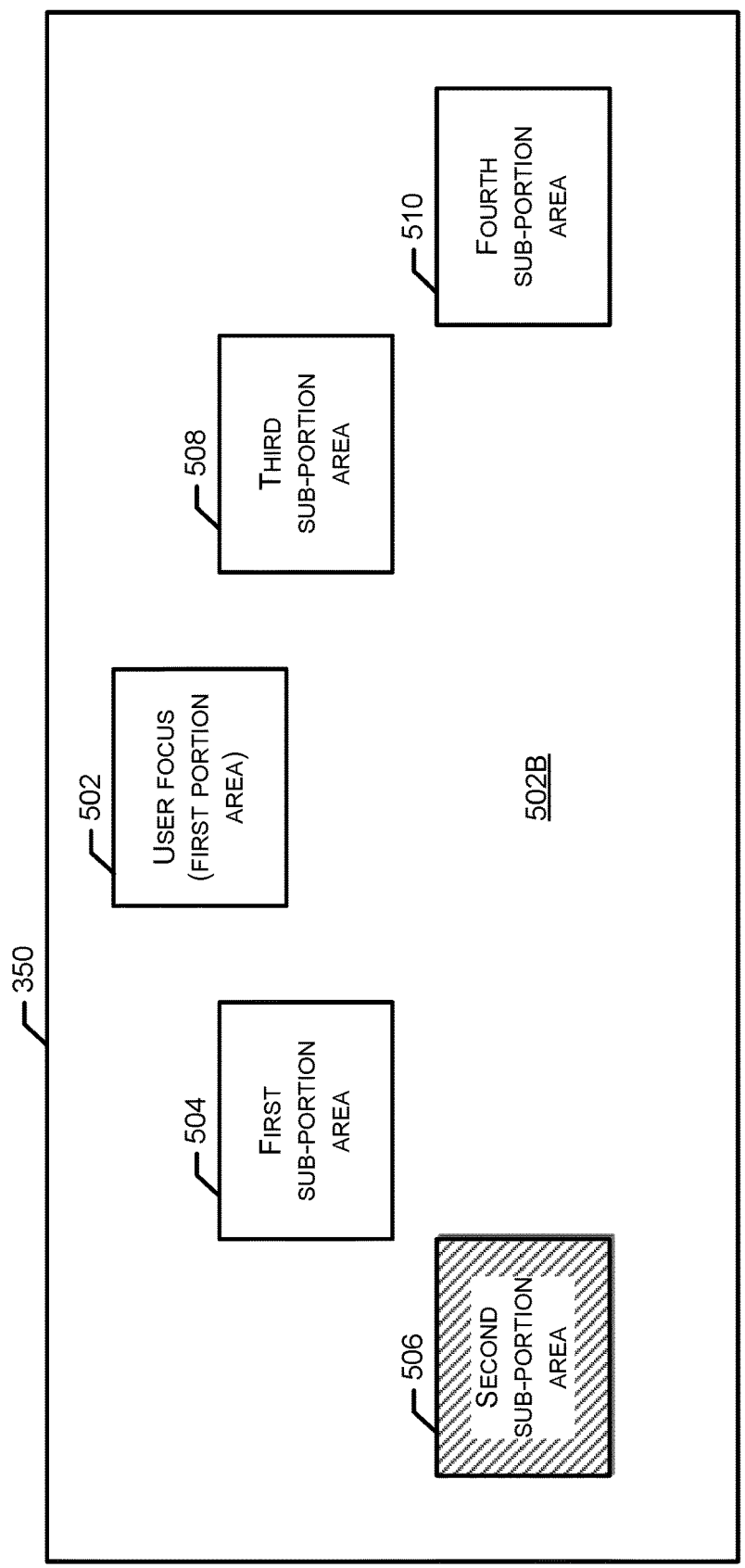
FIG. 5D is a third illustration of the display unit of FIG. 5B.

With reference to FIGS. 5B-5D in another aspect of the present invention, the display unit 350, even if comprised of a plurality of display devices, is treated as a single display. The areas which may be designated as the user focus area are not fixed, but may be dynamically determined by the gaze control application 362. In the exemplary embodiments shown in FIGS. 5B-5D, five areas are shown. However, it should be noted that this is for discussion purposes only, and that the display unit 350 may contain any number of areas, one of which may be designated by the gaze control application 362 as the user focus area 502A.

The market data may be displayed in defined windows (not shown) on the display unit 350. The windows may be moved on the display unit 350, minimized, or resized. In one embodiment, the areas of the display unit 350, i.e., the user focus area 502A and the second area 502B may correspond directly to and/or on one to one basis with a window. Alternatively, the areas may include or be associated with one or more windows.

With particular reference to FIG. 5B, the control gaze application 362 has determined that the trader 410 is currently (or will be) viewing central area, thus the central area is designated as the user focus area 502A. In this example, the second areas are subdivided or designated as first sub-portion area 504, second sub-portion area 506, third sub-portion area 508, and further sub-portion area 510. Each of the sub-portion areas 504, 506, 508, 510 has an associated sub-portion of the market data which is being displayed therein.

In one aspect of the present invention, each sub-portion area is assigned as priority based on a relative distance from or proximity to the user focus area 502A.

In one embodiment, the user focus area 502A is determined as a function of the trader's foveal view. Any sub-portion which is within the trader's binocular field of view is assigned a second priority. Any sub-portion which is within the trader's peripheral view is assigned a third priority.

In a second embodiment, any sub-portion are which is immediate adjacent the user focus area 502A is assigned the second priority and (going outward) the next adjacent area is assigned the third priority. In the illustrated embodiment of FIG. 5B, the first and third sub-portion areas 504, 508 would be assigned the second priority and the second and fourth sub-portion areas 506, 510 would be assigned the third priority. This process continues, dependent on the number of defined areas.

In a third embodiment, the priority could be determined as a directly as a function of the distance between the user focus area 502a and the corresponding sub-portion area. For example, the time between, or rate of, updates in a sub-portion area may be directly proportional to the distance therebetween.

The rate of updating of the market data in at least one of the first and second portions may be dynamically modified to conserve computing resources.

Other priority schemes may be used without departing within the spirit of the invention.

In another aspect of the present invention, the trading device 110 may be configured to highlight the current user focus area 502A. For example, the user focus area 502A may be highlighted by color and/or motion, and/or flashing. The highlighting may be continuous while the area remains the user focus area 502A or may last for a predetermined or variable period of time.

In another aspect of the present invention, the trading device 110 may be configured to provide an update indication to, or highlight, at least a portion of the market data in the second portion of the data within one of the sub-portions areas 502B, 504, 506, 508, 510. The update indication is responsive to a change in the market data associated to the at least a portion of the market data in the second portion. In other words, if one of the areas other than the user focus area 502 has an important update, the trading device 110 may highlight this area to attract the user or trader's attention. The update indication, or highlight may be by color and/or motion and/or flashing.

For example, with particular reference to FIGS. 5C and 5D, the area in the center of the display unit 350 has been designated as the user focus area 502. However, the second sub-portion area 506 has an important update, e.g., a change in the market exceeding a predetermined threshold or some other event which may require the attention of the trader. To attract the trader's attention, the gaze control application 362 and the display manager 364 operate together to highlight the second sub-portion area 506. In FIG. 5C, the second sub-portion area 506 is moved or "vibrated" to attract the trader's attention. In FIG. 5D, the second sub-portion area 506 is highlight via color and/or flashing to attract the trader's attention. The highlighting of the sub-portion area may be (1) for a predetermined time and/or (2) performed periodically until the trader's attention focuses on the highlighted area.

Figure 6:
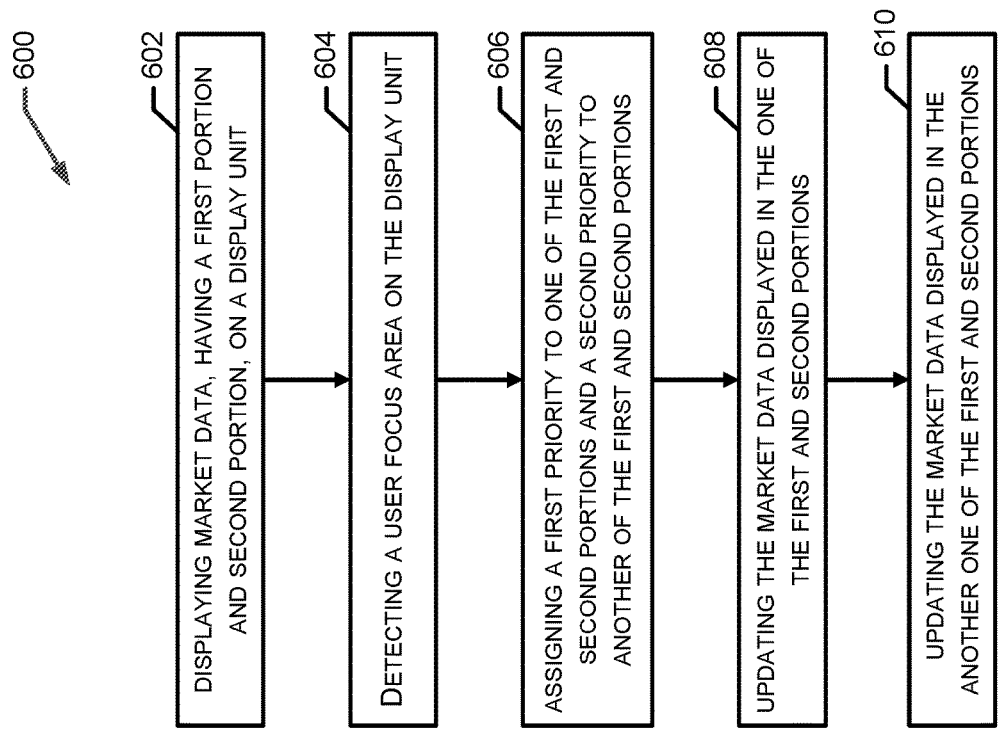
FIG. 6 is a flow diagram of a method according to an embodiment of the present invention.

With particular reference to FIG. 6, in another aspect of the present invention a method 600 of displaying information to a user is provided. The method includes a first step 602 of displaying market data on a display unit of a trading device and a second step 604 of detecting, at the trading device, a user focus area of the display unit. The market data has a first portion and second portion. The user focus area is associated with one of the first and second portions of the market data and another one of the first and second portions of the market data being associated with a second area of the display unit.

In a third step 606, a first priority is assigned to the one of the first and second portions of the market data and a second priority to another one of the first and second portions of the market data. The first priority being associated with the user focus area. The first priority is higher than the second priority.

In a fourth step 608, the market data in the one of the first and second portions, which is being displayed the user focus area, is updated as a function of the first priority and an associated first schedule. In a fifth step 610, the market data in the another one of the first and second portions, which is being displayed in the second area, is updated as a function of the second priority and an associated second schedule.

In another embodiment, upon the detection of a change in the user focus area, a new priority may be assigned to a first portion, while not yet changing any priority to a second or third portion. A user may be engaged in a quick flick of the eyes or rapid but short duration gaze shift to a different portion and then returning the user focus to the original user focus area. In such a situation, and because there could in some embodiments be a slight latency in accomplishing the change in priority, it is beneficial to retain the original priority for a region of the display for a preconfigured or dynamically determined amount of time. After the amount of time has elapsed, then the priority of that region of the display may be changed as described in the previous embodiments.

In another embodiment, upon the detection of a change in user gaze or head or torso orientation or position, a set of possible new user focus areas are identified (ones in the path of the currently detected motion of the user's gaze), and the priorities of those display regions are assigned a new priority prospectively in advance of those regions actually becoming a user focus area. In this fashion, in embodiments in which there can be a small latency involved in changing a priority for updates to a display region, the change in priority can be accomplished earlier thus reducing or eliminating the effects of small latencies in operation from user perception.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A system including:
a trading device including a display unit, a tracking mechanism, a gaze control application, and a display manager, wherein the tracking mechanism includes a sensor, wherein the trading device is configured to:
  receive gaze position data for a user from a sensor of a tracking mechanism of the trading device, wherein the gaze position data represents the user's gaze with respect to a display unit of the trading device;
  determine a user focus area of the display unit based on a field of foveal vision for the user and the gaze position data, wherein the user focus area is associated with a first portion of market data displayed by the display unit of the trading device;
  determine a plurality of sub-portion area of the display unit, wherein the plurality of sub-portion areas do not include the user focus area, wherein each sub-portion area is associated with sub-portion of the market data displayed by the display unit of the trading device;
  assign, in response to determining the user focus area, a first priority to the first portion of the market data;
  assign, in response to determining the plurality of sub-portion areas, a priority to each sub-portion of the market data, wherein the first priority is higher than the priorities of the sub-portions of the market data, wherein the priority of each sub-poriton of the market data is determined as a function of a respective proximity of the corresponding sub-portion area to the user focus area;

modify a first rate of updating for the first portion of the market data prior to being displayed in the user focus area, wherein the first rate of updating is modified based on the assigned first priority;

modify a rate of updating for each sub-portion of the market data prior to being displayed in the corresponding sub-portion area, wherein the rate of updating for each sub-poriton of the market data is modified based on the corresponding assigned priority, wherein the first rate of updating is faster than the rates of updating of the sub-portions of the market data; and display the market data in the first portion and the market data in the sub-portions according to their respective modified rates of updating.

2. The system of claim 1, wherein the tracking mechanism includes at least one of a facial recognition system, an acoustic position system, a distance sensor, and an imaging sensor.

3. The system of claim 1, wherein the display unit includes a plurality of display devices, wherein the user focus area and the plurality of sub-portion areas are displayed on a same one of the display devices.

4. The system of claim 1, wherein the display unit includes a plurality of display devices, wherein the user focus area and at least one of the plurality of sub-portion areas are displayed on different ones of the display devices.

5. The system of claim 1, further including instructions executable to display a highlight, by the trading device, to identify the user focus area on the display unit.

6. The system of claim 5, wherein the user focus area is highlighted using at least one of color, motion, and flashing.

7. The system of claim 1, further including instructions executable to display, by the trading device, an update indication to identify at least one sub-portion area, wherein the update indication is displayed in response to a change in the corresponding sub-portion of the market data.

8. The system of claim 7, wherein the update indication is provided when a change in the corresponding sub-portion of the market data exceeds a predetermined threshold.

9. The system of claim 7, wherein the update indication is at least one of color, motion, and flashing.

10. The system of claim 1, wherein the priorities assigned to each sub-portion of the market data include a second priority and a third priority, wherein the second priority and the third priority are equal.

* * * * *